United States Patent
Plank et al.

(10) Patent No.: US 10,003,783 B2
(45) Date of Patent: Jun. 19, 2018

(54) APPARATUS FOR GENERATING A THREE-DIMENSIONAL COLOR IMAGE AND A METHOD FOR PRODUCING A THREE-DIMENSIONAL COLOR IMAGE

(71) Applicant: Infineon Technologies AG, Neubiberg (DE)

(72) Inventors: Hannes Plank, Dobl (AT); Norbert Druml, Graz (AT)

(73) Assignee: Infineon Technologies AG, Neubiberg (DE)

( * ) Notice: Subject to any disclaimer, the term of this patent is extended or adjusted under 35 U.S.C. 154(b) by 153 days.

(21) Appl. No.: 15/054,527

(22) Filed: Feb. 26, 2016

(65) Prior Publication Data

US 2017/0251194 A1    Aug. 31, 2017

(51) Int. Cl.
*H04N 13/02* (2006.01)
*H04N 13/00* (2018.01)
(Continued)

(52) U.S. Cl.
CPC ......... *H04N 13/0037* (2013.01); *G06T 5/009* (2013.01); *G06T 7/0079* (2013.01); *G06T 7/408* (2013.01); *H04N 13/0203* (2013.01); *H04N 13/0257* (2013.01); *G06T 2207/10012* (2013.01); *G06T 2207/10024* (2013.01); *G06T 2207/10028* (2013.01); *G06T 2207/20192* (2013.01)

(58) Field of Classification Search
CPC . G06T 2207/10012; G06T 2207/10024; G06T 2207/10028; G06T 2207/20192; G06T 5/009; G06T 7/0079; G06T 7/408; H04N 13/0037; H04N 13/0203; H04N 13/0257

USPC .......................................................... 348/46
See application file for complete search history.

(56) References Cited

U.S. PATENT DOCUMENTS 6,249,616 B1 *  6/2001  Hashimoto ............... G06T 7/35
                                                    345/427
9,424,650 B2 *  8/2016  van Baar ............... G06T 7/0075
(Continued)

OTHER PUBLICATIONS

Farbiz et al, Live Three-Dimensional Content for Augmented Reality, Jun. 2005.*
(Continued)

*Primary Examiner* — Shan E Elahi
(74) *Attorney, Agent, or Firm* — Eschweiler & Potashnik, LLC

(57) ABSTRACT

An apparatus comprises an input interface for receiving a color image of at least an object and a low resolution depth image of at least the object. The apparatus further comprises an image processing module configured to produce data for generating a three-dimensional color image based on a first color pixel image data of a first color pixel and a first derived depth pixel image data of a first derived depth pixel. The image processing module is configured to calculate the first derived depth pixel image data based on a measured depth pixel image data of a measured depth pixel and a weighting factor. The weighting factor is based on a color edge magnitude summation value of a path between the first color pixel and the reference color pixel. The apparatus further comprises an output interface for providing the generated three-dimensional color image.

20 Claims, 6 Drawing Sheets

(51) Int. Cl.
  *G06T 5/00* (2006.01)
  *G06T 7/40* (2017.01)
  *G06T 7/00* (2017.01)

(56) References Cited

U.S. PATENT DOCUMENTS

| | | | | |
|---|---|---|---|---|
| 2013/0010079 A1* | 1/2013 | Zhang | H04N 13/0207 | 348/47 |
| 2014/0009462 A1* | 1/2014 | McNamer | G06T 19/20 | 345/419 |
| 2014/0192048 A1* | 7/2014 | Johansson | G06T 15/205 | 345/419 |
| 2014/0368615 A1* | 12/2014 | van Baar | G06T 7/0075 | 348/48 |
| 2015/0002629 A1* | 1/2015 | Wei | H04N 13/0207 | 348/46 |
| 2015/0156476 A1* | 6/2015 | Kobayashi | G02B 27/26 | 348/49 |
| 2015/0245063 A1* | 8/2015 | Rusanovskyy | H04N 19/597 | 375/240.12 |
| 2015/0312551 A1* | 10/2015 | Hosaka | H04N 13/0239 | 348/49 |
| 2016/0337635 A1* | 11/2016 | Nisenzon | H04N 13/0242 | |
| 2017/0150115 A1* | 5/2017 | Vandewalle | H04N 13/0011 | |
| 2017/0223338 A1* | 8/2017 | Kang | G09G 5/006 | |

OTHER PUBLICATIONS

D. Ferstl, C. Reinbacher, R. Ranftl, M. Ruether, and H. Bischof, "Image; Guided Depth Upsampling Using Anisotropic Total Generalized Variation," in IEEE International Conference on Computer Vision (ICCV), Dec. 2013, pp. 993-1000.

J. Park, H. Kim, Y.-W. Tai, M. Brown, and I. Kweon, "High quality depth map upsampling for 3D-TOF cameras," in IEEE International Conference on Computer Vision (ICCV), Nov. 2011, pp. 1623-1630.

J. Kopf, M. F. Cohen, D. Lischinski, and M. Uyttendaele, "Joint Bilateral Upsampling," ACM Transactions on Graphics (TOG), vol. 26, No. 3, Jul. 2007.

L. Dai, F. Zhang, X. Mei, and X. Zhang, "Fast Minimax Path-Based Joint Depth Interpolation," IEEE Signal Processing Letters, vol. 22, No. 5, pp. 623-627, May 2015.

* cited by examiner

| | Coordinates | | Edge Magnitude | | |
|---|---|---|---|---|---|
| Step | X | Y | Color in Figure | Value | SE |
| 0 | 7 | 5 | | 0.25 | 0.25 |
| 1 | 6 | 5 | | 0.25 | 0.5 |
| 2 | 5 | 6 | | 0.25 | 0.75 |
| 3 | 4 | 6 | | 1.0 | 1.75 |
| 4 | 3 | 6 | | 0.25 | 2.0 |

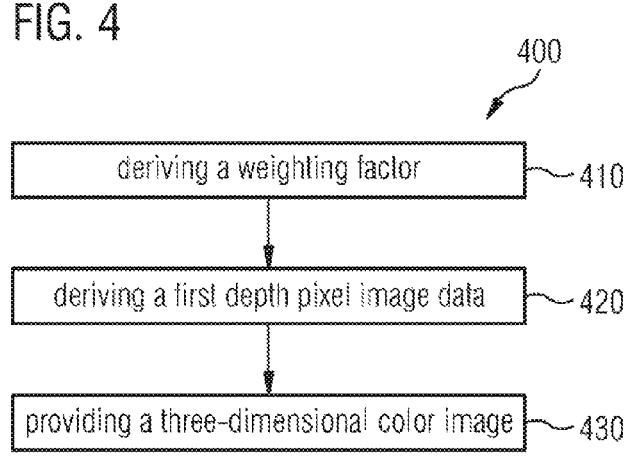
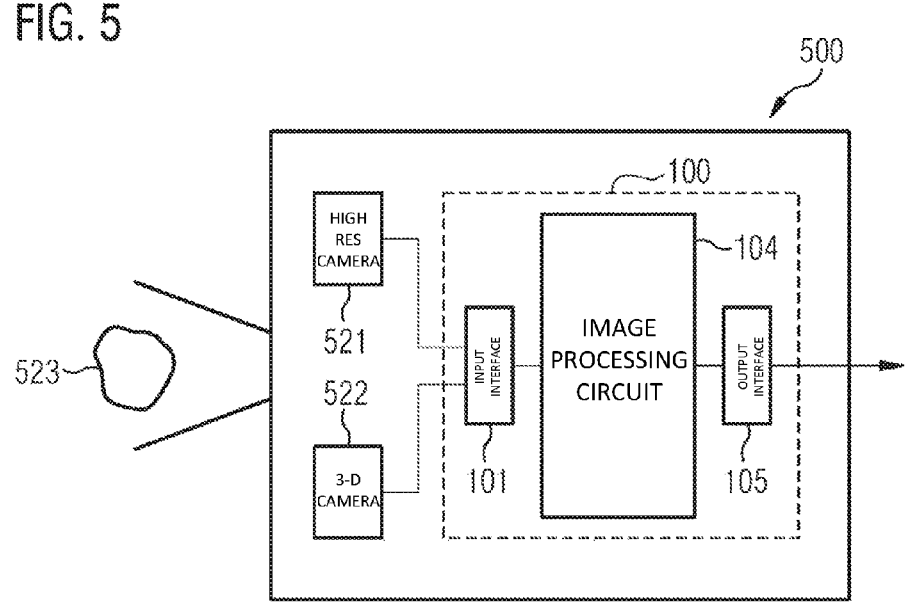

APPARATUS FOR GENERATING A THREE-DIMENSIONAL COLOR IMAGE AND A METHOD FOR PRODUCING A THREE-DIMENSIONAL COLOR IMAGE

FIELD

Embodiments relate to concepts for producing images, and in particular to an apparatus for generating a three-dimensional color image and a method for producing a three-dimensional Color image.

BACKGROUND

Depth sensing systems (e.g. time of flight sensing systems, or e.g. other three-dimensional depth sensing systems) may suffer from poor depth image quality such as low resolution and/or noise. Current methods and operations may be incapable of fusing depth and color data with high performance, and/or may not be able to achieve proper depth data quality enhancement, for example. In addition, many methods cannot be implemented efficiently on graphics processing units (GPUs) due to data dependencies and/or the inability to split the algorithm into parallel tasks, for example.

SUMMARY

Some embodiments relate to an apparatus for generating a three-dimensional color image. The apparatus comprises an input interface for receiving a color image of at least an object and a low resolution depth image of at least the object. The apparatus further comprises an image processing module configured to produce data for generating a three-dimensional color image of at least the object based on a first color pixel image data of a first color pixel of the color image and a first derived depth pixel image data of a first derived depth pixel of a derived high resolution depth image of at least the object. The image processing module is configured to calculate the first derived depth pixel image data based on a measured depth pixel image data of a measured depth pixel of the low resolution depth image and a weighting factor associated with the measured depth pixel image data. The weighting factor is based on a color edge magnitude summation value of a path between the first color pixel and the reference color pixel. The reference color pixel has a pixel position in the color image corresponding to a measured depth pixel in the derived high resolution depth image of the object. The apparatus further comprises an output interface for providing the generated three-dimensional color image.

Some embodiments relate to a method for producing a three-dimensional color image of at least an object. The method comprises deriving a weighting factor associated with a measured depth pixel image data of a measured depth pixel of a low resolution depth image based on a color edge magnitude summation value of a path between a first color pixel of a color image and a reference color pixel of the color image. The method further comprises deriving a first depth pixel image data of a first depth pixel of a high resolution depth image based on the measured depth pixel image data and the weighting factor associated with the measured depth pixel image data. The method further comprises providing a three-dimensional color image of at least the object based on a first color pixel image data of the first color pixel of the color image and the first derived depth pixel image data.

Some embodiments relate to a camera system. The camera system comprises a two-dimensional high resolution camera module for generating a color image of at least an object. The camera system further comprises a three-dimensional camera module for generating a depth image of at least the object. The camera system further comprises an apparatus for generating a three-dimensional color image of at least the object.

BRIEF DESCRIPTION OF THE DRAWINGS

Some embodiments of apparatuses and/or methods will be described in the following by way of example only, and with reference to the accompanying figures, in which

FIG. 4 shows a flow chart of a method for producing a three-dimensional image; and FIG. 5 shows a schematic illustration of a camera system.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
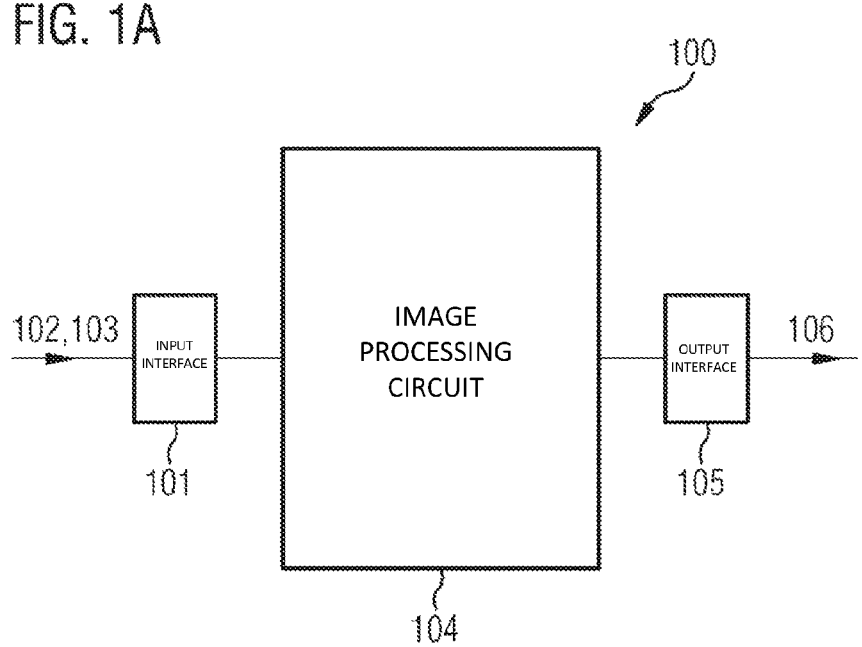
FIG. 1A shows a schematic illustration of an apparatus for generating a three dimensional color image.

FIG. 1A shows a schematic illustration of an apparatus 100 for generating a three-dimensional color image.

The apparatus 100 comprises an input interface 101 for receiving a color image 102 of at least an object and a low resolution depth image 103 of at least the object.

The apparatus 100 further comprises an image processing module 104 configured to produce data for generating a three-dimensional color image 106 of at least the object based on a first color pixel image data of a first color pixel of the color image 102 and a first derived depth pixel image data of a first derived depth pixel of a derived high resolution depth image of at least the object.

The image processing module 104 is configured to calculate the first derived depth pixel image data based on a measured depth pixel image data of a measured depth pixel of the low resolution depth image 103 and a weighting factor associated with the measured depth pixel image data. The weighting factor is based on a color edge magnitude summation value of a path between the first color pixel and the reference color pixel. The reference color pixel has a pixel position in the color image 102 corresponding to a measured depth pixel in the derived high resolution depth image of the object.

The apparatus 100 further comprises an output interface 105 for providing the generated three-dimensional color image 106.

Due to the weighting factor being based on a color edge magnitude summation value of a path between the first color pixel and the reference color pixel, the depth quality in terms of resolution and/or noise-reduction of a generated three-dimensional color image 106 may be improved. Additionally, depth quality enhancement of the generated three-dimensional color image 106 may be achieved while maintaining high performance, for example.

The color image 102 of (at least) the object may be a high-resolution two-dimensional color image. The color image 102 may be two-dimensional array of color pixels. Each color pixel of the color image 102 may include two-dimensional color information (e.g. RGB color space information, or alternatively other color space information) related to the object, for example.

The low resolution depth image 103 of (at least) the object may be two-dimensional array of depth pixels. Each depth pixel of the low resolution depth image 103 may include distance (e.g. depth, e.g. three-dimensional 3D) information related to the object. For example, the depth information may be related to the distance of a surface of the object to a reference plane or reference point, for example.

The color image 102 of the object received by the input interface 101 of the apparatus may have a higher resolution (e.g. pixel resolution) than a resolution of the low resolution depth image 103, for example. The resolution or pixel resolution may refer to the number of pixels of a two-dimensional array of the image.

The image processing module 104 may be configured to derive the high resolution depth image 107 of at least the object. For example, as a starting situation, the depth may be mapped to the high resolution color image 102. For example, the image processing module 104 may be configured to derive the high resolution depth image 107 of the object based at least on the measured depth pixels of the low resolution depth image 103. For example, the image processing module 104 may be configured to derive the high resolution depth image 107 of the object by converting the measured depth pixel image data of each measured depth pixel of the low resolution depth image 103 to the image space of the color image 102 of the object in order to obtain at least part of the high resolution depth image 107.

Figure 1B:
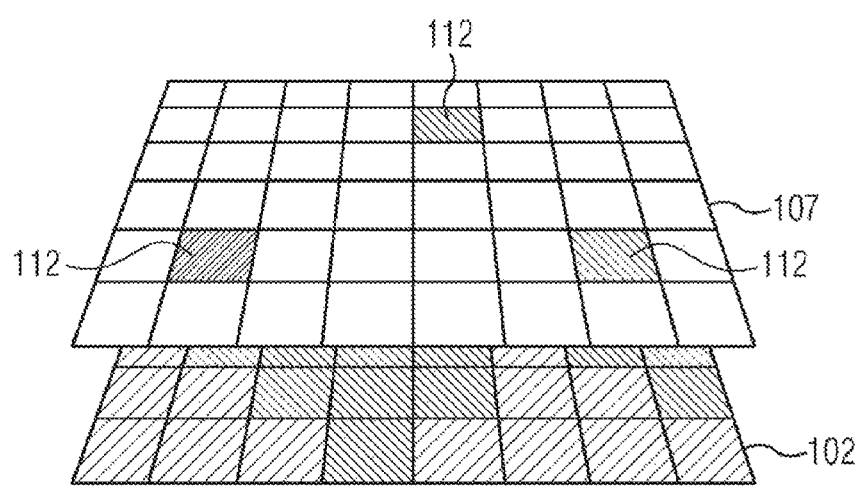
FIG. 1B shows a schematic illustration of at least part of a high resolution depth image and a color image.

The image processing module 104 may be configured to map the measured depth pixel image data of the measured depth pixels of the low resolution depth image 103 of the object to the image space of the color image 102 of the object (as shown in FIG. 1B). Thus, the high resolution depth image 107 to be derived may have the (same) image space of the color image 102. The image processing module 104 may be configured to derive the high resolution depth image 107 based on the low resolution depth image 103 of the object. For example, the number of depth pixels in the low resolution image 103 may be the same as the mapped pixels 112 in the high resolution depth image 107. The high resolution depth image 107 may have the same size (e.g. the same pixel resolution) as the color image 102, for example. For example, the number of pixels of the upsampled high resolution depth image 107 may be the same as (or e.g. equal to) the number of pixels of the color image 102.

The high resolution depth image 107 derived (or derivable) by the image processing module 104 may include at least one (e.g. one or more, or e.g. a plurality of) depth pixel derived based on measured depth pixel image data of a measured depth pixel of the low resolution depth image 103, for example. For example, the high resolution depth image 107 may include (or have) a first group of depth pixels. Each depth pixel of the first group of depth pixels of the high resolution depth image 107 may be derived based on measured depth pixel image data of a plurality of different measured depth pixels of the low resolution depth image 103.

The image processing module 104 may be configured to calculate each depth pixel of a second group of depth pixels of the high resolution depth image 107. The depth pixels of the second group of depth pixels may exclude (or e.g. may be different from) the depth pixels of the first group of depth pixels of the high resolution depth image.

The image processing module 104 may be configured to derive the depth pixels (e.g. each depth pixel) of the second group of depth pixels of the high resolution depth image 107 to generate the high resolution depth image 107. For example, the image processing module 104 may be configured to calculate (or e.g. derive) depth pixel image data for each depth pixel (of the second group of depth pixels) of the high resolution depth image 107.

For example, the image processing module 104 may be configured to calculate a first derived depth pixel image data of a first derived depth pixel of the high resolution depth image 107. For example, the image processing module 104 may be configured to calculate the first derived depth pixel image data of the first derived depth pixel based on measured depth pixel image data of a (or e.g. at least one, or e.g. one or more) measured depth pixel of the high resolution depth image 107 and a weighting factor, w, associated with the measured depth pixel image data of the measured depth pixel. For example, multiple depth values (from the low resolution depth image) may influence the outcome of each high-resolution depth value.

The image processing module 104 may be configured to calculate the weighting factor associated with the measured depth pixel image data of the measured depth pixel based on the color edge magnitude summation value, $S_E$, of a path between the first color pixel and the reference color pixel (e.g. of a path from the first color pixel to the reference color pixel).

Figure 1C:
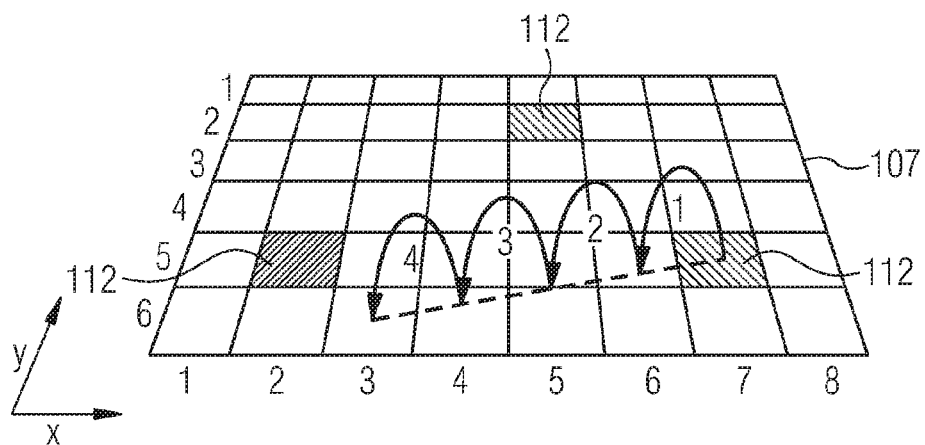
FIG. 1C shows a schematic illustration of at least part of a high resolution depth image.
Figure 1D:
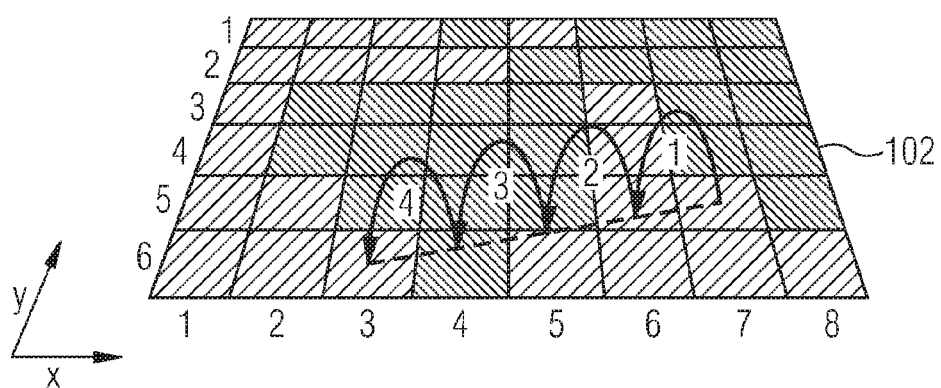
FIG. 1D shows a schematic illustration of at least part of a color image.

The reference color pixel has a pixel position in the color image 102 corresponding to the measured depth pixel in the derived high resolution depth image 107 of the object. For example, the reference color pixel may have a pixel position in the color image 102 which may be the same as a pixel position of the measured depth pixel in the derived high resolution depth image 107 of the object (as shown in FIGS. 1C to 1D).

The weighting factor, w, is based on a color edge magnitude summation value, $S_E$, of the path (e.g. the pixel path) between the first color pixel of the received color image 102 and the reference color pixel of the received color image 102. For example, the weighting factor, w, may decrease with an increasing color edge magnitude summation value, $S_E$, between the first color pixel and the reference color pixel. For example, the weighting factor, w, may decrease exponentially with an increasing color edge magnitude summation value, $S_E$, between the first color pixel and the reference color pixel.

The weighting factor (which may be referred to as the interpolation weight), w, quantifies the influence of each (measured) depth value. The function or formula to convert the color edge magnitude summation value, $S_E$, to the weighting factor, w, may be one that allows small changes of $S_E$ to lead to large changes of w. Additionally, depth values may need to be restricted from propagating over edges if there are valid depth measurements on the other side of the edge. For example, depth values may be restricted from propagating across edges, because of the decreasing weighting factor.

A natural exponential function (e) may suit this purpose well. For example, the image processing module 104 may be configured to calculate the weighting factor, w, based on the color edge magnitude summation value, $S_E$ according to the relationship:

$$w = e^{\frac{-S_E}{\sigma}}.$$

w may represent the weighting factor.

$S_E$ may represent the color edge magnitude summation value based on a sum of color edge magnitude values between the first color pixel and the reference color pixel.

σ may represent a scalar parameter. The parameter σ may scale the argument of the exponential function, in order to restrict the range of the weighting factor, w, to the boundaries of a floating point data type (e.g. a 32 bit floating point data type), for example. For example, the smaller the scalar parameter, the steeper the exponential function and the larger the influence decay. Thus, a smaller scalar parameter may lead to a sharper upscaled depth image. For example, the parameter σ may be less than 0.6 (or e.g. less than 0.05, or e.g. less than 0.01). For example, the image processing module 104 may be configured to select the value of the scalar parameter. Optionally, the parameter σ may be selected to be as small as possible.

Optionally, the weighting factor, w, may be based solely (or only) on the color edge magnitude summation value, $S_E$, and the scalar parameter, for example. In other words, the color edge magnitude summation value, $S_E$, may be the only variable parameter influencing the weighting, w, for example.

The image processing module 104 may be configured to calculate the first derived depth pixel image data of the first derived depth pixel based on the at least one measured depth pixel. Optionally, the image processing module 104 may be configured to calculate the first derived depth pixel image data of the first derived depth pixel based on more than one measured depth pixel (or e.g. a plurality of measured depth pixels) influencing the first derived depth pixel image data of the first derived depth pixel to be derived.

For example, the first derived depth pixel may lie within a first pixel influence radius of the first measured depth pixel and within a second pixel influence radius of the second measured depth pixel. Thus, the image processing module 104 may be configured to calculate (or derive) the first derived depth pixel image data of the first derived depth pixel based on a weighting factor associated with the first measured depth pixel image data of the first measured depth pixel and a weighting factor associated with the second measured depth pixel image data of the second measured depth pixel. For example, the image processing module 104 may be configured to derive each weighting factor, $w_n$, associated with each measured depth pixel, n, in whose pixel influence radius the first derived depth pixel lies.

Each weighting factor $w_n$ may be derived based on a corresponding color edge magnitude summation value, $S_E$. For example, the image processing module 104 may be configured to derive the weighting factor associated with the first measured depth pixel image data of the first measured depth pixel based on a color edge magnitude summation value, $S_E$, of a path between the first color pixel and the first reference color pixel. The first reference color pixel has a pixel position in the color image 102 corresponding to a (first) measured depth pixel in the derived high resolution depth image 107 of the object. Additionally, the image processing module 104 may be configured to derive the weighting factor associated with the second measured depth pixel image data of the second measured depth pixel based on a color edge magnitude summation value, $S_E$, of a path between the first color pixel and the second reference color pixel. The second reference color pixel has a pixel position in the color image 102 corresponding to a (second) measured depth pixel in the derived high resolution depth image 107 of the object.

The image processing module 104 may be configured to determine the (or each) color edge magnitude summation value, $S_E$, based on at least one color edge magnitude value of a plurality of color edge magnitude values derived by the image processing module 104. Additionally optionally or alternatively, the color edge magnitude summation value, $S_E$, may be based on a sum of all crossed color edges.

The image processing module 104 may be configured to determine the plurality of color edge magnitude values by deriving an edge guidance image (e.g. shown in FIG. 2A) based on the color image 102 of the object. For example, the image processing module 104 may be configured to determine the plurality of color edge magnitude values corresponding to a plurality of color pixels of the color image 102 by an edge filtering operation of the color image 102. For example, optionally, a (or each) color edge magnitude value of a (or each) color pixel of the plurality of color pixels may be derived based on color information from (only) directly neighboring pixels of the pixel. For example, the edge filtering operation may determine a color edge magnitude value of a color pixel of the plurality of color pixels based on the color information (or e.g. color values) of 4 pixels surrounding the color pixel.

The image processing module 104 may be configured to derive the plurality of color edge magnitude values based on a Sobel operation of (or applied to) the color image 102. Alternatively or optionally, the image processing module 104 may be configured to derive the plurality of color edge magnitude values by applying an edge filtering operation to the color image 102 such as a Canny operation, a Laplacian of Gaussians operation or a Prewitt operation.

The image processing module 104 may include an edge magnitude value memory. The image processing module 104 may be configured to store the plurality of color edge magnitude values in the edge magnitude value memory of the image processing module 104, for example.

The image processing module 104 may be configured to calculate (or derive) a plurality of color edge magnitude summation values after determining and/or storing the plurality of color edge magnitude values. The image processing module 104 may be configured to calculate the plurality of color edge magnitude summation values, $S_E$, each corresponding to a plurality of derived depth pixels to be derived lying within a pixel influence area of the measured depth pixel.

Figures 2A, 2B:
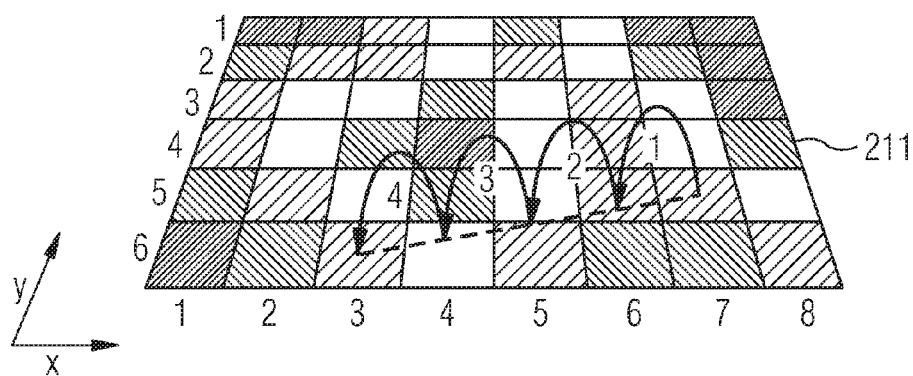
FIG. 2A shows a schematic illustration of at least part of an edge guidance image.
FIG. 2B shows a table illustrating a determination of a plurality of color edge magnitude summation values.

The image processing module 104 may be configured to determine the (or each) color edge magnitude summation value, $S_E$, based on at least one (e.g. one or more, or e.g. a plurality) color edge magnitude value of a plurality of color edge magnitude values stored in the edge magnitude value memory. For example, the image processing module 104 may be configured to determine the color edge magnitude summation value, $S_E$, based on a sum (e.g. an addition, or e.g. a summation) of color edge magnitude values along (or on, or of) the pixel path between the first color pixel and the reference color pixel (e.g. from the first color pixel to the reference color pixel). For example, the color edge magnitude summation value, $S_E$, may be based on a sum (e.g. an addition, or e.g. a summation) of color edge magnitude values along the pixel path between the first color pixel and the reference color pixel, including the color edge magnitude value of the first color pixel and the color edge magnitude value of the reference color pixel (as shown in FIG. 2B).

To satisfy the requirement that $S_E$ is the sum of all edges (e.g. edge magnitudes) along the pixel path between pixel i (pixel i may represent each derived depth pixel to be derived) and the mapped depth value $d_n$ ($d_n$ may represent the measured depth pixel image data of a measured depth pixel, n, influencing the derived depth pixel image data), the surrounding pixels may need to be parsed in a specific order (as shown in FIGS. 3A to 3D).

The pixel influence area surrounding the measured depth pixel 331 may be defined by a pixel radius which may be an Euclidean distance to the measured depth pixel, for example. The influenced pixels 332 may lie within the pixel influence area defined by the pixel radius, r, for example. Each newly processed pixel may depend on its predecessor along the pixel path.

The image processing module 104 may be configured to calculate the plurality of color edge magnitude summation values, $S_E$, corresponding to the plurality of derived depth pixels to be derived according to a parsing order. For example, the image processing module 104 may be configured to calculate the plurality of color edge magnitude summation values $S_E$, according to the parsing order along at least one circular path around the measured depth pixel.

The image processing module 104 may include a memory array for storing the plurality of color edge magnitude summation values $S_E$, according to the parsing order. The image processing module 104 may be configured to calculate the plurality of weighting factors corresponding to the plurality of derived depth pixel image data based on the parsing order of the plurality of color edge magnitude summation values stored in the memory array.

Calculating the pixel paths during computation may be avoided by the lookup table. The table may store the relative pixel positions on the paths in the correct order. A small array may be used to buffer the sum of edge weights on the path, $S_E$, for each pixel, so it can be looked up during the next pixel operation on the path. This may avert the prerequisite to parse the pixels along the radial pixel paths, as long the hierarchy shown in FIGS. 3A to 3D is satisfied. As a consequence, the lookup table may be cleaned of all redundant operations, and just n pixel operations for n influenced pixels may be required, for example.

Each (depth) pixel of the resulting high-resolution depth image may be influenced by several depth values (e.g. more than one, or e.g. more than two, or e.g. more than 4, or e.g. more than 5) which are then interpolated by their propagated influence, for example. If only one depth value influences the pixel, the pixel value may be identical with the depth value, for example. If no depth values influence a pixel, there is no interpolation and the value remains undefined, for example.

The image processing module 104 may be configured to calculate the (first) derived depth pixel image data of the first derived depth pixel based on a sum of weighting factors $\Sigma_{n=1}^{k} w_n$ and a sum of weighted depth values $\Sigma_{n=1}^{k} d_n \cdot w_n$ associated with the at least one measured depth pixel (or e.g. a plurality of measured depth pixels) influencing the (first) derived depth pixel image data to be derived. Each weighted depth value of the sum of weighted depth values may be based on a product (e.g. a multiplication) of a measured depth pixel image data $d_n$ and a weighting factor $w_n$ associated with the measured depth pixel.

For example, the image processing module 104 may be configured to calculate each derived depth pixel image data, $d_i$, of the high resolution depth image based on the relationship (or e.g. the interpolation formula):

$$d_i = \frac{\sum_{n=1}^{k} d_n \cdot w_n}{\sum_{n=1}^{k} w_n}.$$

$d_i$ may represent the derived depth pixel image data of a derived depth pixel, i, of the high resolution depth image, for example. For example, $d_i$ may represent the final interpolated depth for each color pixel i.

k may represent the number of measured depth pixels influencing the derived depth pixel, for example.

$d_n$ may represent the measured depth pixel image data of a measured depth pixel, n, influencing the derived depth pixel image data, for example.

$w_n$ may represent the associated weighting factor associated with the measured depth pixel, n, for example.

The k depth values, $d_n$, which influence a pixel i may be interpolated with the interpolation formula by using the ratios of the weights w, resulting in the final depth, di. The depth values may propagate their influence to the influence sphere of other depth values to reduce noise. Since color edges may greatly reduce the influence, the noise reduction may be edge preserving.

The introduced algorithm may be efficiently implemented with some modifications. The number of calculations and memory access operations may be reduced. For example, the interpolation formula may be reformulated as an update formula. For example, $d_{sum}$ and $w_{sum}$ may be stored for each pixel and may replace the upper and lower fraction terms in the interpolation formula. They may be updated every time a depth value operates on a pixel.

The image processing module 104 may be configured to update the sum of weighted depth values, $d_{sum}$, associated with the first derived depth pixel image data to be derived if a new measured depth pixel influences the first derived depth pixel image data to be derived. Each weighted depth value of the sum of weighted depths values may be based on a product (e.g. a multiplication) of a measured depth pixel image data of a measured depth pixel influencing the first derived depth pixel image data to be derived and a weighting factor associated with the measured depth pixel. The image processing module 104 may be configured to update the sum of weighted depth values, $d_{sum}$, according to the relationship:

$$d_{sum} = d_{sum} + d_n \cdot w_{new}$$

$w_{new}$ may represent a new weighting factor of a new measured depth pixel influencing the first derived depth pixel image data to be derived.

The image processing module 104 may be configured to update the sum of weighting factors, $w_{sum}$, associated with the first derived depth pixel image data to be derived if a new measured depth pixel influences the first derived depth pixel image data to be derived. Each weighting factor of the sum of weighting factors may be associated with a (different) measured depth pixel influencing the first derived depth pixel image data of the first derived depth pixel to be derived. The image processing module 104 may be configured to update the sum of weighting factors, $w_{sum}$, according to the relationship:

$$w_{sum} = w_{sum} + w_{new}$$

The image processing module 104 may include a weighting factor memory for storing the sum of weighting factors, $w_{sum}$, associated with the first derived depth pixel image data to be derived.

The image processing module 104 may include a weighted depth value memory for storing the sum of weighted depth values, $d_{sum}$, associated with the first derived depth pixel image data to be derived.

The final depth pixel image data, di, of the derived depth pixel may be calculated by dividing $d_{sum}$, and $w_{sum}$ on each pixel i, according to the relationship:

$$d_i = \frac{d_{sum}}{w_{sum}}$$

The image processing module 104 may include a derived depth pixel image data memory for storing at least the first derived depth pixel image data, $d_1$, of the first derived depth pixel. For example, the derived depth pixel image data memory may store the derived depth pixel image data, $d_i$, of each derived depth pixel of a plurality of derived depth pixels.

The image processing module 104 may be configured to update the first derived depth pixel image data based on a previously stored derived depth pixel image data of the first derived depth pixel and a new weighted depth value associated with the first derived depth pixel image data. For example, the mapped positions of the depth values may change every frame, and it may not be possible to predict how many depth values may influence an output pixel with each frame.

The operation may require at least 3 memory access operations per pixel (e.g. accessing the weighting factor memory, the weighted depth value memory and the derived depth pixel image data memory). For example, every pixel has its own $d_i$, $d_{sum}$ and $w_{sum}$ value which may result in three image-sized buffers on the GPU (graphics processing unit).

Optionally, the number of memory access operations may be reduced. For example, to avoid at least one buffer, the sum of weighted depth values, $d_{sum}$, may be re-calculated every time instead of saved. For example, if $d_i$ is calculated and updated during the depth influence propagation, $d_{sum}$ may be extracted by multiplying $d_i$ with $w_{sum}$ Without storing $d_{sum}$ for each pixel, the depth $d_i$ and $w_{sum}$ may be updated at each pixel operation according to the following relationships:

$$w = e^{\frac{-S_E}{\sigma}}$$

$$w_{sum} = w_{sum} + w_n$$

$$d_i = \frac{d_i \cdot (w_{sum} - w_n) + d_n \cdot w_n}{w_{sum}}$$

Thus, one less memory access operation (e.g. 2 memory access operations) may be used per pixel.

The image processing module 104 is configured to produce data for generating the three-dimensional color image 106 of (at least) the object based on the first color pixel image data of a first color pixel of the received color image 102 and the first derived depth pixel image data, $d_1$, of the first derived depth pixel of the derived high resolution depth image 107 of (at least) the object. The first color pixel may have a pixel position in the color image 102 corresponding to the first derived depth pixel in the derived high resolution depth image 107 of the object. The derived first three-dimensional color pixel of the three-dimensional color image 106 may have a pixel position in the three-dimensional color image 106 corresponding to the first derived depth pixel in the derived high resolution depth image 107 and the pixel position of the first color pixel in the color image 102.

For example, the image processing module 104 may be configured to produce data for generating the three-dimensional color image 106 of the object based on color pixel image data of a plurality of color pixels of the received color image 102 and the derived depth pixel image data $d_i$ of a plurality of derived depth pixels of the derived high resolution depth image 107 of the object. For example, a derived three-dimensional color pixel of a plurality of derived three-dimensional color pixels of the three-dimensional color image 106 may derived based on a derived depth pixel of the derived high resolution depth image 107 and a color pixel of the color image. The derived depth pixel may have the same pixel position in the derived high resolution depth image 107 as the derived three-dimensional color pixel and the color pixel may have the same pixel position in the color image 102 as the derived three-dimensional color pixel.

The three-dimensional color image 106 generated by the image processing module 104 may have the same pixel resolution as the high resolution depth image 107 and the color image 102, for example.

The image processing module 104 may be configured to produce data for generating the three-dimensional color image 106 based on a plurality of color images 102 (e.g. color image frames) and a plurality of low resolution depth images 103 (e.g. low resolution depth image frames) received by the input interface 101 of the apparatus 100. For example, the image processing module 104 may be configured to process at least 5 (or at least 10 to 15) frames per second on a GPU, for example.

The apparatus 100 may be a computer microcontroller (e.g. a central processing unit CPU), a processor or may be part of a computer, a processor or microcontroller, for example. The apparatus 100 may be part of a camera system (e.g. a mobile devices, or e.g. a telecommunications device, or e.g. a computer, or e.g. laptop) which may include a 3D camera for generating a depth image and a color camera for generating a 2D color image, for example.

Each module of the apparatus 100 (e.g. the image processing module) may be (or may be part of, or may include) a computer (e.g. a central processing unit CPU), a processor, a microcontroller, or a circuit, for example.

The input interface 101 may be an input port of a computer, a processor or a microcontroller, for example. The input interface 101 may be coupled to the apparatus 100 via a wired or wireless connection, for example.

The input interface 101 of the apparatus 100 may be configured to receive the low resolution depth image of at least the object from a three-dimensional (3D) sensing device which may be configured to generate the low resolution depth image. For example, the input interface 101 may be configured to receive the low resolution depth image from a least one of a time of flight (TOF) camera, a camera for producing three-dimensional images (e.g. a 3D camera module) or an ultrasonic sensor. Additionally, the input interface 101 of the apparatus 100 may be configured to receive the high resolution color image of at least the object from a two-dimensional (2D) sensing device (e.g. from a two-dimensional high resolution camera module) which may be configured to generate the high resolution color image.

The output interface 105 of the apparatus 100 for providing the generated three-dimensional color image 106 may include (or may be) a video port, which may be configured to provide the generated three-dimensional color image 106 to a display device, for example.

The object may be a person, or thing, or scenery to be photographed, for example. For example, the object may be three-dimensional and/or may have color.

The examples described herein may relate to color and depth fusion. For example, for many applications, depth images may be combined with a high-resolution color camera. The color information may be used to increase depth quality to obtain a high-resolution color image, with depth information available for each pixel. The high-resolution (3D) color image may be used for computational photography, depth based image filtering applications, object detection and/or object tracking, for example.

The examples described herein may relate to interpolating low-resolution depth data based on performance requirements for real-time applications. Using the color edges, the various examples described may improve the depth (image) quality in terms of resolution and noise-reduction. The examples described herein may achieve depth quality enhancement while maintaining high performance. The examples described herein may tackle performance issues of other approaches by an algorithm, capable of performing high-quality TOF and/or color sensor fusion with low computational complexity. The algorithm's design may be optimized for execution on GPUs. This involves the capability of being executed in parallel and bundled data operations, for example. The presented sensor fusion provides depth images with upscaled resolution, increased sharpness, less noise, less motion artifacts, and achieves high frame rates at the same time.

The examples described herein may relate to an efficient depth interpolation procedure, capable of increasing depth resolution and noise-reduction. In the examples, the depth influence may be propagated over the color image. Propagation over color image edges may drastically reduce the depth influence, for example. In the examples, the influence on each color pixel may be used to interpolate depth.

Depth upscaling methods or approaches may include global methods or local methods. Global methods relating to a global optimization problem may yield good quality, but may be very slow. Local methods may have quality drawbacks and may be based on iterative solutions. Depth interpolation approaches formulated as optimization problems, graph-based or iterative approaches, which yield to slow performance. For example, they may not be optimized for efficient computation. This may disqualify the application in interactive and time-critical systems. Fast approaches may lack of depth image quality. For example, joint bilateral filtering may produce inferior image quality, especially with large upscaling factors and may be significantly slower due to their being applied iteratively.

In the examples described herein, the image processing module 104 may be configured to carry out the interpolation algorithm. The interpolation weights of the depth values may be propagated in the high resolution image. Color image edges may restrict the propagation because color edges are often depth image edges. This may cause the depth values to propagate among homogenous surfaces leading to a high resolution and reduced noise, for example.

The input for the depth upscaling algorithm may be a color image and a sparsely mapped depth image with identical resolution. A preparation step may be the extraction of edge information from the color image with a Sobel operator (or an edge filtering operator). The algorithm may take each mapped depth value in the sparse depth image and execute the interpolation procedure. The algorithm may be executed in parallel for each depth value and may be interpreted as the propagation of depth value influence over a local circular area on the color image. A radial path from the mapped depth value position to each influenced pixel may be parsed.

In the examples described herein, pixels may be parsed on path and regarding all edges in between, independent of locality. In the examples described herein, iterative processes may be avoided. In the examples described herein, fast interpolation may be used and mathematic optimization may be avoided. In the examples described herein, interpolation along paths between depth values, and minimum spanning trees may be avoided, for example. Radial paths from each depth value, and overwriting existing depth values may be used instead. In the examples described herein, resolution may be increased or improved.

FIG. 1B shows a schematic illustration of at least part of the high resolution depth image 107 (e.g. a sparse depth frame) and the color image 102. For example, the depth may be mapped to the high resolution color image 102.

As shown in FIG. 1B, the measured depth pixel image data of measured depth pixels of the low resolution depth image the object may be mapped to the image space of the color image 102 to obtain the high resolution color image 107. For example, FIG. 1B shows the first group of depth pixels 112 of the high resolution depth image 107 derived based on measured depth pixel image data of a plurality of different measured depth pixels of the low resolution depth image, FIG. 1C shows a schematic illustration of at least part of the high resolution depth image 107 (e.g. a sparse depth frame) of the object derived by the image processing module 104. For example, FIG. 1C shows the influence propagation. For example, FIGS. 1C and 1D show pixel parsing along circular paths for each depth value (e.g. $d_n$), for example.

As shown in FIG. 1C, the depth pixels of the first group of depth pixels 112 may include depth pixel 7,5, depth pixel 5,2 and depth pixel 2,5, which may each be derived based on measured depth pixel image data of different measured depth pixels of the low resolution depth image 103, for example.

For example, the image processing module 104 may be configured to calculate a first derived depth pixel image data (e.g. $d_1$) of a first derived depth pixel (e.g. depth pixel 3,6) of the derived (or derivable) high resolution depth image 107. For example, the image processing module 104 may be configured to calculate the first derived depth pixel image data of the first derived depth pixel (e.g. depth pixel 3,6) based on the depth pixel (e.g. depth pixel 7,5) of the high resolution depth image 107 and a weighting factor, w, associated with the measured depth pixel image data of the measured depth pixel (e.g. depth pixel 7,5). The depth pixel (e.g. depth pixel 7,5) of the high resolution depth image 107 for deriving the first derived depth pixel of the high resolution depth image 107 may have been derived by the image processing module 104 based on measured depth pixel image data of a measured depth pixel of the low resolution depth image 103.

An example of a depth influence propagation path is illustrated in FIG. 1C. The influence of a depth value on the output depends on the sum of edge (magnitude) values, $S_E$, between the mapped depth value (at 7,5) and each pixel to be derived (e.g. the first derived depth pixel 3,6).

FIG. 1D shows a schematic illustration of at least part of the color image 102 (e.g. a color image frame) of the object received by the image processing module 104.

As shown in FIG. 1D, the reference color pixel (e.g. color pixel 7,5) has a pixel position in the color image 102 corresponding to the measured depth pixel (e.g. depth pixel 7,5) in the derived high resolution depth image 107 of the object. For example, the reference color pixel (e.g. color pixel 7,5) may have a pixel position in the color image 102 which may be the same as a pixel position of the measured depth pixel (e.g. depth pixel 7,5) in the derived high resolution depth image 107 of the object.

The image processing module 104 may be configured to calculate the weighting factor associated with the measured depth pixel image data of the measured depth pixel (e.g. depth pixel 7,5) based on the color edge magnitude summation value, $S_E$, of a path between the first color pixel (color pixel 3,6) and the reference color pixel (7,5).

The dotted line may mark the traveled pixel path between the measured depth pixel (e.g. depth pixel 7,5) and the destination pixel to be derived (e.g. the first derived depth pixel 3,6). For every pixel on the path, the influence may be calculated and updated. For example, no color edges are crossed at step 1 and 2. The color edges crossed at step 3 and 4 (in FIG. 1D) decrease the depth influence, for example. The influence may decrease when edges of the color image are passed. For example, step 3 between the color pixel 5,6 and the color pixel 4,6 may pass a different colored region. The influence decreases after this step. During step 4, another color edge may be passed and the influence decreases again. Additionally or optionally, the spatial distance from each pixel to be derived (e.g. the first derived depth pixel 3,6) to the depth value (e.g. the measured depth pixel 7,5) may have no influence. For example, the color edge magnitude summation value and/or the weighting factor may be independent from the spatial distance between each pixel to be derived (e.g. the first derived depth pixel 3,6) and the measured depth pixel 7,5. The weighting factor decreases with the sum of the magnitudes of the color edges. For example, minor edges do not contribute as much as stronger edges, for example.

The weighting factor, w, is based on a color edge magnitude summation value, $S_E$, of the path (e.g. the pixel path) between the first color pixel (e.g. color pixel 3,6) of the received color image 102 and the reference color pixel (e.g. color pixel 7,5) of the received color image 102. For example, the weighting factor, w, may decrease with an increasing color edge magnitude summation value, $S_E$, between the first color pixel (e.g. color pixel 3,6) and the reference color pixel (e.g. color pixel 7,5). For example, the weighting factor, w, may decrease exponentially with an increasing color edge magnitude summation value, $S_E$, between the first color pixel (e.g. color pixel 3,6) and the reference color pixel (e.g. color pixel 7,5).

The image processing module 104 may be configured to calculate the first derived depth pixel image data of the first derived depth pixel (e.g. depth pixel 3,6) based on the at least one measured depth pixel (e.g. depth pixel 7,5). Optionally, the image processing module 104 may be configured to calculate the first derived depth pixel image data of the first derived depth pixel (e.g. depth pixel 3,6) based on more than one measured depth pixel (or e.g. a plurality of measured depth pixels) influencing the first derived depth pixel image data of the first derived depth pixel (e.g. depth pixel 3,6) to be derived.

For example, the first derived depth pixel (e.g. depth pixel 3,6) may lie within a first pixel influence radius of the first measured depth pixel (e.g. depth pixel 7,5) and within a second pixel influence radius of the second measured depth pixel (e.g. depth pixel 2,5). Thus, the image processing module 104 may be configured to calculate (or derive) the first derived depth pixel image data of the first derived depth pixel (e.g. depth pixel 3,6) based on a weighting factor associated with the first measured depth pixel image data of the first measured depth pixel (e.g. depth pixel 7,5) and a weighting factor associated with the second measured depth pixel image data of the second measured depth pixel (e.g. depth pixel 2,5). For example, the image processing module 104 may be configured to derive each weighting factor $w_n$ associated with each measured depth pixel, n, in whose pixel influence radius the first derived depth pixel (e.g. depth pixel 3,6) lies.

Each weighting factor $w_n$ may be derived based on a corresponding color edge magnitude summation value, $S_E$. For example, the image processing module 104 may be configured to derive the weighting factor associated with the first measured depth pixel image data of the first measured depth pixel (e.g. depth pixel 7,5) based on a color edge magnitude summation value, $S_E$, of a path between the first color pixel (e.g. color pixel 3,6) and the first reference color pixel (e.g. color pixel 7,5). The first reference color pixel (e.g. color pixel 7,5) has a pixel position in the color image 102 corresponding to a (first) measured depth pixel (e.g.

depth pixel 7,5) in the derived high resolution depth image 107 of the object. Additionally, the image processing module 104 may be configured to derive the weighting factor associated with the second measured depth pixel image data of the second measured depth pixel (e.g. depth pixel 2,5) based on a color edge magnitude summation value, $S_E$, of a path between the first color pixel (e.g. color pixel 3,6) and the second reference color pixel (e.g. color pixel 2,5). The second reference color pixel (e.g. color pixel 2,5) has a pixel position in the color image 102 corresponding to a (second) measured depth pixel (e.g. depth pixel 2,5) in the derived high resolution depth image 107 of the object.

The image processing module 104 may be configured to determine the color edge magnitude summation value, $S_E$, based on a sum (e.g. an addition, or e.g. a summation) of color edge magnitude values along the pixel path between the first color pixel (e.g. color pixel 3,6) and the reference color pixel (e.g. color pixel 7,5).

FIG. 2A shows a schematic illustration of at least part of an edge guidance image 211 of the object derived by the image processing module 104.

The image processing module 104 may be configured to determine the plurality of color edge magnitude values corresponding to a plurality of color pixels of the color image 102 by an edge filtering operation (e.g. a Sobel operation) of the color image 102.

A (or each) color edge magnitude value of a (or each) color pixel of the plurality of color pixels may be derived based on color information from (only) directly neighboring pixels of the pixel. The edge filtering operation may determine a color edge magnitude value of each color pixel based on the color information (or e.g. color values) of pixels directly surrounding the color pixel. For example, the edge filtering operation may determine a color edge magnitude value (0.25) of the first reference color pixel based on the color information (or e.g. color values) of pixels directly surrounding the first reference color pixel (e.g. pixel 7,4, pixel 7,6, pixel 6,5 and pixel 8,5) as shown in FIG. 2B.

The edge guidance image may be a realistic sample for an edge image. It may be derived by using a Sobel or a similar edge filter. The edge guidance image may be coded with a grey scale ranging from black (e.g. which represents no edges) to white (which represents a strong edge), for example.

FIG. 2B shows a table illustrating a determination of a plurality of color edge magnitude summation values, $S_E$, along the pixel path between the first color pixel (e.g. color pixel 3,6) and the reference color pixel (e.g. color pixel 7,5).

As shown in FIG. 2B, each color edge magnitude summation values, $S_E$, corresponding to a derived depth pixel to be derived, may be calculated based on a sum (e.g. an addition, or e.g. a summation) of color edge magnitude values between the reference color pixel and the derived depth pixel to be derived.

The color edge magnitude summation value, $S_E$, corresponding to the first derived depth pixel (e.g. depth pixel 3,6) to be derived may be calculated based on the sum of color edge magnitude values between the reference color pixel (e.g. color pixel 7,5) and the first color pixel (e.g. color pixel 3,6). The first derived depth pixel (e.g. depth pixel 3,6) to be derived lies within a pixel influence area of the measured depth pixel (e.g. depth pixel 7,5). In the example, at step 4, $S_E$=2.0. The newly processed pixel (e.g. the color edge magnitude summation value, $S_E$, corresponding to the depth pixel 3,6) may depend on its predecessor (4,6) along the pixel path.

According to the parsing order, a further color edge magnitude summation value, $S_E$, corresponding to a further derived depth pixel (e.g. depth pixel 5,6) to be derived may be calculated. The further derived depth pixel (e.g. depth pixel 5,6) to be derived also lies within a pixel influence area of the measured depth pixel (e.g. depth pixel 7,5). For example, the further color edge magnitude summation value, $S_E$, corresponding to a further derived depth pixel (e.g. depth pixel 5,6) may be calculated based on the sum of color edge magnitude values between the reference color pixel (e.g. color pixel 7,5) and a further color pixel (e.g. color pixel 5,6). In the example, at step 2, $S_E$=0.75. The processed pixel (e.g. the color edge magnitude summation value, $S_E$, corresponding to the depth pixel 5,6) may depend on its predecessor (6,5) along the pixel path. Due to the parsing order, the further derived depth pixel (e.g. depth pixel 5,6) to be derived may be calculated before the first derived depth pixel (e.g. depth pixel 3,6), for example.

It appears that $S_E$ grows until step 2 despite not crossing any color edges. This may be due to the nature of the edge detection, which detects pixels besides edges, not (or independent from) the exact pixel boundaries. This does not influence the result because the effect is approximately the same for every depth value, for example.

More details and aspects are mentioned in connection with the embodiments described above or below. The embodiments shown in FIGS. 2A to 2B may each comprise one or more optional additional features corresponding to one or more aspects mentioned in connection with the proposed concept or one or more embodiments described above (e.g. FIGS. 1A to 1D) or below (FIGS. 3A to 5).

FIGS. 3A to 3D show schematic illustrations of the pixel parsing hierarchy of each mapped depth value 331. For example, FIGS. 3A to 3D illustrate the dependence hierarchy caused by the radial parsing principle.

Figure 3A:
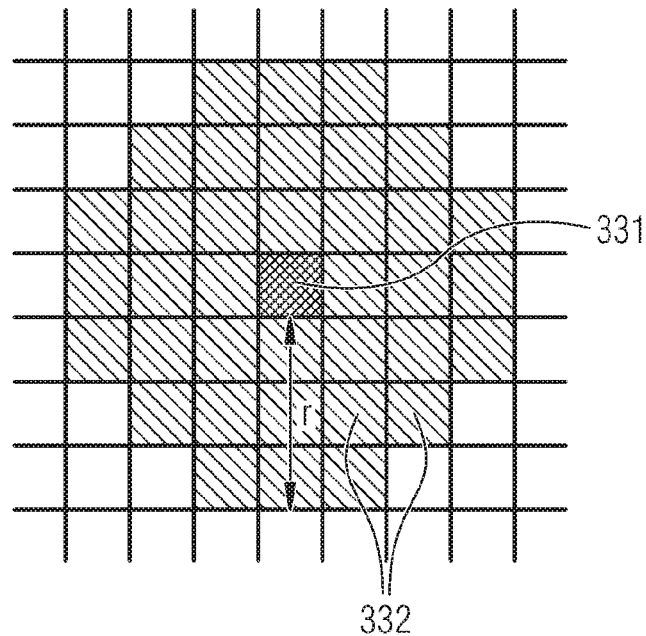
FIGS. 3A to 3D show schematic illustrations of a pixel parsing hierarchy of a mapped depth value.

As shown in FIG. 3A, the pixel influence area surrounding the measured depth pixel may be defined by a pixel radius, r. The pixel influence area that is influenced by a measured depth pixel may be referred to as a kernel. FIG. 3A shows a pixel radius (or kernel size) of 3, for example. A kernel size of 3 processes all pixels within an Euclidean distance of 3 pixels to the measured depth pixel, for example. The image processing module 104 may be configured to control (or select or calculate) a pixel influence area and/or a pixel radius based on a resolution ratio of the received color image 102 and/or a resolution ratio of the received low resolution depth image 107, for example. For example, the pixel influence radius, r, may be calculated based on the following relationship assuming the ratio between height and width is always the same:

$$r = \text{Floor}\left(\text{Max}\left(\frac{RCx}{RDx}*Qf, \frac{RCy}{RDy}*Qf\right) + 0.5\right)$$

RCx may represent the width of the color image in pixels.
RCy may represent the height of the color image in pixels.
RDx may represent the width of the depth image in pixels.
RDy may represent the height of the depth image in pixels.
Qf may represent the quality factor. Qf may be a value between 1 and 4, for example.

Figure 3B:
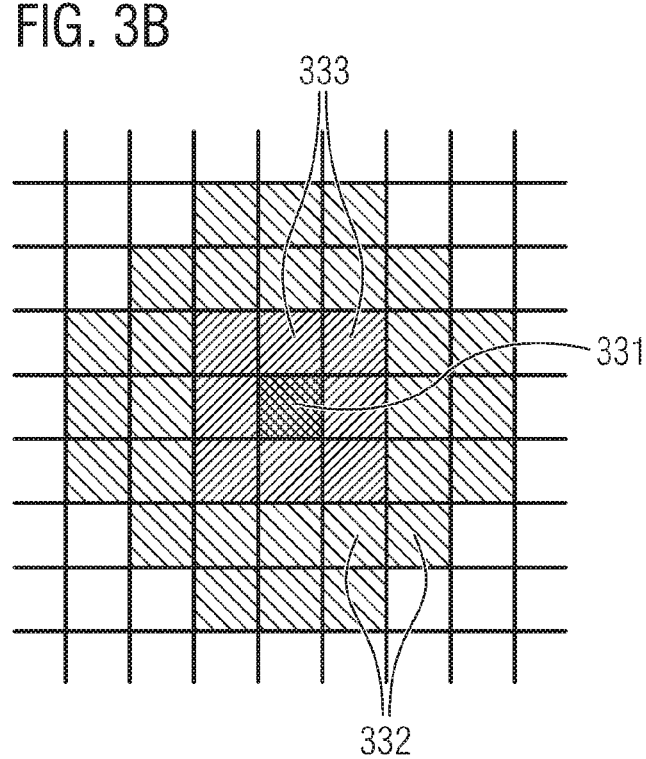
Figure 3C:
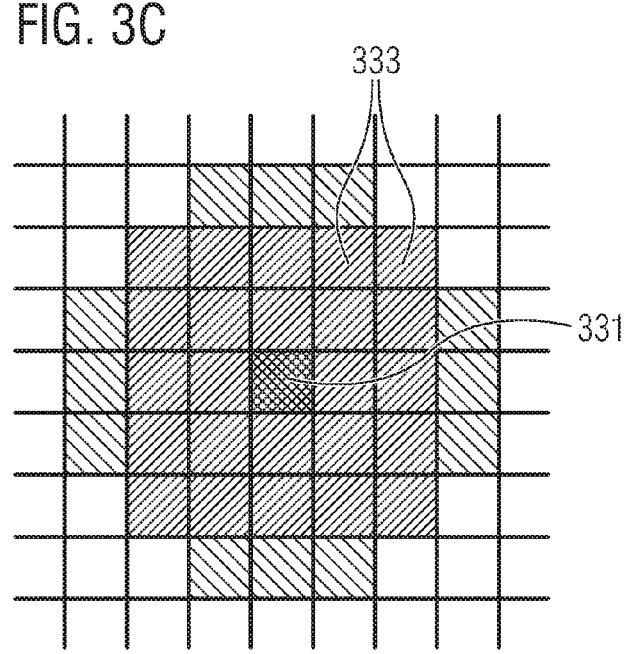
Figure 3D:
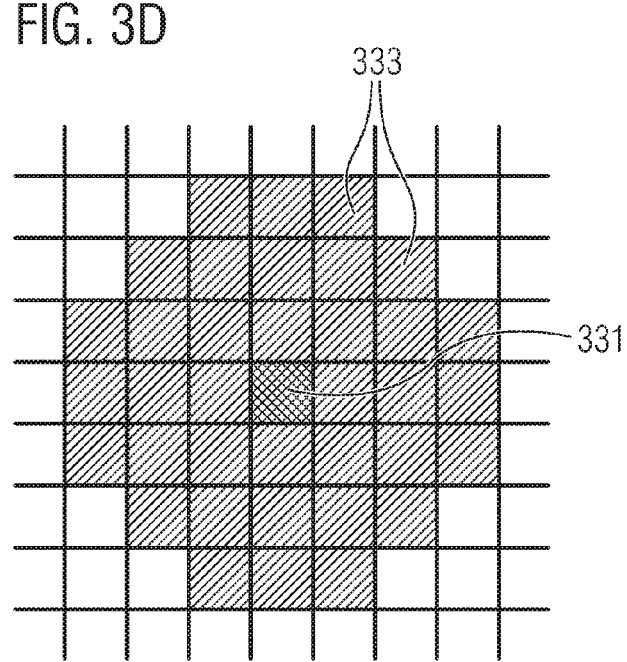

As shown in FIGS. 3B to 3D, the image processing module 104 may be configured to calculate the plurality of color edge magnitude summation values, $S_E$, corresponding to the plurality of derived depth pixels to be derived according to the parsing order along one or more circular paths around the measured depth pixel 331. For example, FIGS. 3B to 3D show processed pixels the plurality of color edge magnitude summation values, $S_E$, corresponding to the plurality of derived depth pixels to be derived according to an expanding circular path around the measured depth pixel 331.

More details and aspects are mentioned in connection with the embodiments described above or below. The embodiments shown in FIGS. 3A to 3D may each comprise one or more optional additional features corresponding to one or more aspects mentioned in connection with the proposed concept or one or more embodiments described above (e.g. FIGS. 1A to 2B) or below (FIGS. 4 to 5).

FIG. 4 shows a schematic illustration of a method 400 for producing a three-dimensional color image of at least an object.

The method 400 comprises deriving 410 a weighting factor associated with a measured depth pixel image data of a measured depth pixel of a low resolution depth image based on a color edge magnitude summation value of a path between a first color pixel of a color image and a reference color pixel of the color image.

The method 400 further comprises deriving 420 a first depth pixel image data of a first depth pixel of a high resolution depth image based on the measured depth pixel image data and the weighting factor associated with the measured depth pixel image data.

The method 400 further comprises providing 430 a three-dimensional color image of at least the object based on a first color pixel image data of the first color pixel of the color image and the first derived depth pixel image data.

Due to the deriving of the weighting factor based on a color edge magnitude summation value of a path between the first color pixel and the reference color pixel, the depth quality in terms of resolution and/or noise-reduction of the provided three-dimensional color image may be improved. Additionally, depth quality enhancement of the provided three-dimensional color image may be achieved while maintaining high performance, for example.

The weighting factor, w, is based on a color edge magnitude summation value, $S_E$, of the path (e.g. the pixel path) between the first color pixel of the received color image 102 and the reference color pixel of the received color image 102. For example, the weighting factor, w, may decrease with an increasing color edge magnitude summation value, $S_E$, between the first color pixel and the reference color pixel. For example, the weighting factor, w, may decrease exponentially with an increasing color edge magnitude summation value, $S_E$, between the first color pixel and the reference color pixel.

The method 400 may further include determining the color edge magnitude summation value, $S_E$, based on at least one color edge magnitude value of a plurality of color edge magnitude values. The determining of the color edge magnitude summation value, $S_E$, may include summing (e.g. adding) color edge magnitude values along a pixel path between the first color pixel and the reference color pixel. The first color pixel may have a pixel position in the color image corresponding to the first derived depth pixel in the derived high resolution depth image of the object.

The method 400 may further include determining the plurality of color edge magnitude values by applying an edge filtering operation of the color image. The edge filtering operation may be a Sobel operation, a Canny operation, a Laplacian of Gaussians operation or a Prewitt operation.

The three-dimensional color image may have the same resolution as the high resolution depth image and the color image, for example. The derived first three-dimensional color pixel of the three-dimensional color image may have a pixel position in the three-dimensional color image corresponding to the first derived depth pixel in the derived high resolution depth image and the pixel position of the first color pixel in the color image, for example.

More details and aspects are mentioned in connection with the embodiments described above or below. The embodiments shown in FIG. 4 may comprise one or more optional additional features corresponding to one or more aspects mentioned in connection with the proposed concept or one or more embodiments described above (e.g. FIGS. 1A to 3D) or below (FIG. 5).

FIG. 5 shows a schematic illustration of a camera system 500.

The camera system 500 comprises a two-dimensional high resolution camera module 521 for generating a color image of at least an object 523. The camera system 500 further comprises a three-dimensional camera module 522 for generating a depth image of at least the object 523. The camera system 500 further comprises an apparatus 100 for generating a three-dimensional color image of at least the object 523.

Due to the camera system 500 comprising the apparatus 100, the camera system 500 may generate a high resolution three-dimensional color image. Due to the weighting factor for generating the three-dimensional color image being based on a color edge magnitude summation value of a path between the first color pixel and the reference color pixel, the depth quality in terms of resolution and/or noise-reduction of a generated three-dimensional color image may be improved. Additionally, depth quality enhancement of the generated three-dimensional color image may be achieved while maintaining high performance, for example.

The apparatus 100 may include one or more or all of the features of the apparatus 100 described in connection with FIGS. 1 to 4. For example, the apparatus 100 comprises an input interface 101 for receiving a color image of at least an object and a low resolution depth image of at least the object.

The apparatus 100 further comprises an image processing module 104 configured to produce data for generating a three-dimensional color image of at least the object based on a first color pixel image data of a first color pixel of the color image and a first derived depth pixel image data of a first derived depth pixel of a derived high resolution depth image of at least the object.

The image processing module 104 is configured to calculate the first derived depth pixel image data based on a measured depth pixel image data of a measured depth pixel of the low resolution depth image and a weighting factor associated with the measured depth pixel image data. The weighting factor is based on a color edge magnitude summation value of a path between the first color pixel and the reference color pixel. The reference color pixel has a pixel position in the color image corresponding to a measured depth pixel in the derived high resolution depth image of the object.

The apparatus 100 further comprises an output interface 105 for providing the generated three-dimensional color image 106.

The three-dimensional camera module 522 may be (or may include) a time of flight (TOF) camera, a camera for producing three-dimensional images (e.g. a 3D camera) or an ultrasonic sensor. Each depth pixel of the low resolution depth (3D) image may include distance (e.g. depth, e.g.

three-dimensional 3D) information related to the object. For example, the depth information may be related to the distance of a surface of the object to a reference plane or reference point, for example.

The two-dimensional high resolution camera module 521 may be a two-dimensional (2D) sensing device configured to generate the high resolution color image, for example. The color image of (at least) the object may be a high-resolution two-dimensional color image (e.g. without depth information). Each color pixel of the color image may include two-dimensional color information (e.g. RGB color space information, or alternatively other color space information) related to the object, for example.

The camera system 500 may be (or may be part of, or may include) a computer (e.g. a central processing unit CPU), a processor, a microcontroller, or a circuit, for example. For example, the camera system 500 may be or may include a mobile device, a telecommunications device, a computer, or a laptop.

Each camera module (e.g. the two-dimensional high resolution camera module 521 and the three-dimensional camera module 522) of the camera system may include a computer (e.g. a central processing unit CPU), a processor, a microcontroller, or a circuit for generating images related to at least the object, for example.

Various embodiments described herein relate to an efficient way of increasing depth image quality (e.g. Time-of-Flight depth image quality) with color information, for example.

Aspects and features (e.g. the apparatus, the three-dimensional color image, the input interface, the color image, the object, the low resolution depth image, the image processing module, the first color pixel image data, the first color pixel, the first derived depth pixel image data, the first derived depth pixel, the derived high resolution depth image, the weighting factor, the measured depth pixel image data, the measured depth pixel, the color edge magnitude summation value, the color edge magnitude value, the edge magnitude value memory, the parsing order, the weighted depth values, the weighting factor memory, the weighted depth value memory, the derived depth pixel image data memory, the interpolation algorithm, the update formulae, the pixel path, the output interface) mentioned in connection with one or more specific examples may be combined with one or more of the other examples.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. An apparatus for generating a three-dimensional color image, comprising:
   an input interface circuit for receiving a color image of at least an object and a low resolution depth image of at least the object;
   an image processing circuit configured to produce data that represents a three-dimensional color image of at least the object based on a first color pixel image data of a first color pixel of the color image and a first derived depth pixel image data of a first derived depth pixel of a derived high resolution depth image of at least the object,
   wherein the image processing circuit is configured to calculate the first derived depth pixel image data based on a measured depth pixel image data of a measured depth pixel of the low resolution depth image and a weighting factor associated with the measured depth pixel image data,
   wherein the weighting factor is based on a color edge magnitude summation value of a path between the first color pixel and the reference color pixel,
   wherein the reference color pixel has a pixel position in the color image corresponding to a measured depth pixel in the derived high resolution depth image of the object; and
   an output interface circuit for providing the generated three-dimensional color image.

2. The apparatus according to claim 1, wherein the weighting factor decreases with an increasing color edge magnitude summation value between the first color pixel and the reference color pixel.

3. The apparatus according to claim 1, wherein the image processing circuit is configured to calculate the weighting factor based on the color edge magnitude summation value according to the relationship:

$$w = e^{\frac{-S_E}{\sigma}},$$

wherein w represents the weighting factor,
wherein $S_E$ represents a color edge magnitude summation value based on a sum of color edge magnitude values between the first color pixel and the reference color pixel, and
wherein $\sigma$ represents a scalar parameter.

4. The apparatus according to claim 1, wherein the image processing circuit is configured to determine the color edge magnitude summation value based on at least one color edge magnitude value of a plurality of color edge magnitude values stored in an edge magnitude value memory of the image processing module.

5. The apparatus according to claim 1, wherein the image processing circuit is configured to determine a plurality of color edge magnitude values corresponding to a plurality of color pixels of the color image by an edge filtering operation of the color image.

6. The apparatus according to claim 1, wherein the image processing circuit is configured to calculate a plurality of color edge magnitude summation values corresponding to a plurality of derived depth pixels to be derived lying within a pixel influence area of the measured depth pixel.

7. The apparatus according to claim 6, wherein the plurality of color edge magnitude summation values corresponding to the plurality of derived depth pixels to be derived is calculated according to a parsing order.

8. The apparatus according to claim 6, wherein the plurality of color edge magnitude summation values is calculated according to the parsing order along at least one circular path around the measured depth pixel.

9. The apparatus according to claim 6, wherein the image processing circuit comprises a memory array for storing the plurality of color edge magnitude summation values according to the parsing order.

10. The apparatus according to claim 9, wherein the image processing circuit is configured to calculate a plurality of weighting factors corresponding to the plurality of derived depth pixel image data based on the parsing order of the plurality of color edge magnitude summation values stored in the memory array.

11. The apparatus according to claim 1, wherein the image processing circuit is configured to calculate the first derived depth pixel image data based on a first weighting factor associated with a first measured depth pixel image data of a first measured depth pixel and on a second weighting factor associated with a second measured depth pixel image data of a second measured depth pixel, wherein the first derived depth pixel lies within a first pixel influence radius of the first measured depth pixel and within a second pixel influence radius of the second measured depth pixel.

12. The apparatus according to claim 1, wherein the image processing circuit is configured to calculate the first derived depth pixel image data based on a sum of weighting factors and a sum of weighted depth values associated with at least one measured depth pixel influencing the derived depth pixel image data to be derived.

13. The apparatus according to claim 12, wherein each weighted depth value of the sum of weighted depth values is based on a product of a measured depth pixel image data and a weighting factor associated with the measured depth pixel.

14. The apparatus according to claim 1, wherein the image processing circuit comprises a weighting factor memory for storing a sum of weighting factors associated with the first derived depth pixel image data to be derived, wherein each weighting factor of the sum of weighting factors is associated with a measured depth pixel influencing the first derived depth pixel image data to be derived.

15. The apparatus according to claim 14, wherein the image processing circuit is configured to update the sum of weighting factors associated with the first derived depth pixel image data to be derived if a new measured depth pixel influences the first derived depth pixel image data to be derived.

16. The apparatus according to claim 1, wherein the image processing circuit comprises a weighted depth value memory for storing a sum of weighted depth values associated with the first derived depth pixel image data to be derived, wherein each weighted depth value of the sum of weighted depths values is based on a product of a measured depth pixel image data of a measured depth pixel influencing the first derived depth pixel image data to be derived and a weighting factor associated with the measured depth pixel.

17. The apparatus according to claim 1, wherein the image processing circuit comprises a derived depth pixel image data memory for storing at least the first derived depth pixel image data.

18. The apparatus according to claim 1, wherein the image processing circuit is configured to update the first derived depth pixel image data based on a previously stored derived depth pixel image data of the first derived depth pixel and a new weighted depth value associated with the first derived depth pixel image data.

19. A camera system, comprising:
  a two-dimensional high resolution camera for generating a color image of at least an object;
  a three-dimensional camera for generating a low resolution depth image of at least the object; and
  an apparatus for generating a three-dimensional color image, comprising:
    an input interface circuit for receiving the color image of at least an object and the low resolution depth image of at least the object;
    an image processing circuit configured to produce data that represents a three-dimensional color image of at least the object based on a first color pixel image data of a first color pixel of the color image and a first derived depth pixel image data of a first derived depth pixel of a derived high resolution depth image of at least the object,
    wherein the image processing circuit is configured to calculate the first derived depth pixel image data based on a measured depth pixel image data of a measured depth pixel of the low resolution depth image and a weighting factor associated with the measured depth pixel image data,
    wherein the weighting factor is based on a color edge magnitude summation value of a path between the first color pixel and the reference color pixel,
    wherein the reference color pixel has a pixel position in the color image corresponding to a measured depth pixel in the derived high resolution depth image of the object; and
  an output interface circuit for providing the generated three-dimensional color image.

20. A method for producing a three-dimensional color image of at least an object, the method comprising:
  deriving a weighting factor associated with a measured depth pixel image data of a measured depth pixel of a low resolution depth image based on a color edge magnitude summation value of a path between a first color pixel of a color image and a reference color pixel of the color image using an image processing circuit;
  deriving a first depth pixel image data of a first depth pixel of a high resolution depth image based on the measured depth pixel image data and the weighting factor associated with the measured depth pixel image data using the image processing circuit; and
  providing a three-dimensional color image of at least the object based on a first color pixel image data of the first color pixel of the color image and the first derived depth pixel image data using the image processing circuit.

* * * * *